US011836018B2

(12) United States Patent
Larsen

(10) Patent No.: US 11,836,018 B2
(45) Date of Patent: Dec. 5, 2023

(54) ROBOTIC SYSTEM INCLUDING AN INTERNAL COOLING SYSTEM

(71) Applicant: CANRIG ROBOTIC TECHNOLOGIES AS, Sandnes (NO)

(72) Inventor: Ørjan Helgaland Larsen, Sandnes (NO)

(73) Assignee: Canrig Robotic Technologies AS, Sandnes (NO)

( * ) Notice: Subject to any disclaimer, the term of this patent is extended or adjusted under 35 U.S.C. 154(b) by 224 days.

(21) Appl. No.: 17/200,534

(22) Filed: Mar. 12, 2021

(65) Prior Publication Data

US 2021/0293102 A1    Sep. 23, 2021

Related U.S. Application Data

(60) Provisional application No. 62/991,729, filed on Mar. 19, 2020.

(51) Int. Cl.
*E21B 36/00* (2006.01)
*G06F 1/20* (2006.01)

(52) U.S. Cl.
CPC .......... *G06F 1/20* (2013.01); *G06F 2200/201* (2013.01)

(58) Field of Classification Search
CPC .. H05K 5/06; H05K 7/20145; H05K 7/20272; H05K 7/20327; H05K 7/20918; H05K 7/208; H05K 7/2039; E21B 36/001; E21B 47/0175; E21B 47/017; E21B 43/267; E21B 43/26; F28D 2021/0029; B25J 9/026; B25J 11/0025; B25J 19/0054; G06F 2200/201; G06F 1/20

USPC .......... 361/677, 695, 701, 699, 676, 679.48, 361/689, 690, 704, 700; 165/104.33, 59; 175/26, 104

See application file for complete search history.

(56) References Cited

U.S. PATENT DOCUMENTS

| 6,138,776 | A  | 10/2000 | Hart et al. |
| 6,392,322 | B1 | 5/2002 | Mares et al. |
| 6,731,091 | B2 | 5/2004 | Hietmann et al. |
| 7,464,622 | B2 | 12/2008 | Markert et al. |
| 8,015,890 | B2 | 9/2011 | Christensen et al. |

(Continued)

FOREIGN PATENT DOCUMENTS

| BR | PI0915190 B1 | 4/2019 |
| CN | 108000556 A | 5/2018 |

(Continued)

OTHER PUBLICATIONS

Dyao Stephen Ogunyale, "Design of Cooling Systems for 6-Axis Welding Robot Drives," HAMK University of Applied Sciences, Degree Programme in Augomation Engineering, Valkeakoski Jan. 2, 2013, 38 pgs.

(Continued)

*Primary Examiner* — Mandeep S Buttar
(74) *Attorney, Agent, or Firm* — Abel Schillinger, LLP

(57) ABSTRACT

A robot, robotic systems, and methods for conducting a subterranean operation. In some embodiments, a robot may include a hazardous atmosphere controlled volume, such as an explosive (EX)-certified chamber, that is located within the body of the robot. In some embodiments, a robot may include a cooling system that is at least partially disposed to fully disposed within the body of the robot, such as partially to fully disposed within the EX-certified chamber located within the body.

20 Claims, 8 Drawing Sheets

(56) References Cited

U.S. PATENT DOCUMENTS

| | | | |
|---|---|---|---|
| 8,109,370 | B2 | 2/2012 | Yamasaki |
| 8,495,930 | B2 | 7/2013 | Haughom |
| 8,777,199 | B2 | 7/2014 | Webb |
| 9,369,024 | B2 | 6/2016 | Yamasaki et al. |
| 9,574,648 | B2 | 2/2017 | Ikeda et al. |
| 9,614,408 | B2 | 4/2017 | Funada |
| 9,768,662 | B2 | 9/2017 | Urata et al. |
| 9,890,840 | B2 | 2/2018 | Ohnishi et al. |
| 10,480,291 | B2 | 11/2019 | Wiedecke et al. |
| 10,648,545 | B2 | 5/2020 | Mizuuchi |
| 10,822,891 | B2 | 11/2020 | Mikalsen et al. |
| 11,085,512 | B2 | 8/2021 | Shimizu |
| 11,313,184 | B2 | 4/2022 | Søyland et al. |
| 2004/0051326 | A1 | 3/2004 | Belik |
| 2004/0231127 | A1 | 11/2004 | Cartsensen |
| 2004/0237726 | A1 | 12/2004 | Schulze Beckinghausen |
| 2006/0102697 | A1 | 5/2006 | Nagai et al. |
| 2007/0074606 | A1 | 4/2007 | Halse |
| 2008/0277108 | A1 | 11/2008 | Bouligny, Jr. et al. |
| 2010/0025046 | A1 | 2/2010 | Francis et al. |
| 2010/0226094 | A1* | 9/2010 | Attlesey ............ H05K 7/20772 361/699 |
| 2011/0169357 | A1 | 7/2011 | Gieras et al. |
| 2013/0071218 | A1* | 3/2013 | Hosek ............... H01L 21/67259 414/744.5 |
| 2014/0305265 | A1 | 10/2014 | Haughom |
| 2015/0101826 | A1 | 4/2015 | Gupta et al. |
| 2015/0107850 | A1 | 4/2015 | Mosing et al. |
| 2015/0252633 | A1 | 9/2015 | Fulks |
| 2015/0285348 | A1 | 10/2015 | Ikeda et al. |
| 2016/0338221 | A1* | 11/2016 | Rush ................. H05K 7/20936 |
| 2016/0340030 | A1 | 11/2016 | Roussey et al. |
| 2017/0074056 | A1* | 3/2017 | Roodenburg .......... E21B 15/02 |
| 2019/0017619 | A1 | 1/2019 | Gagliano et al. |
| 2019/0136669 | A1 | 5/2019 | Wiedecke et al. |
| 2019/0137964 | A1* | 5/2019 | Wiedecke .......... G05B 19/0423 |
| 2019/0195034 | A1* | 6/2019 | Leite .................... E21B 19/165 |
| 2019/0309586 | A1* | 10/2019 | Søyland .............. B25J 15/0004 |
| 2019/0330937 | A1 | 10/2019 | Mikalsen et al. |
| 2020/0023513 | A1* | 1/2020 | Ha ...................... B25J 19/0054 |
| 2020/0039095 | A1* | 2/2020 | Wagner ............. H05K 7/20918 |
| 2020/0157893 | A1* | 5/2020 | Jorud ................... E21B 19/165 |
| 2021/0293091 | A1 | 9/2021 | Mikalsen et al. |
| 2021/0293100 | A1 | 9/2021 | Van Duivendijk et al. |
| 2021/0293101 | A1 | 9/2021 | Søyland |
| 2021/0293102 | A1* | 9/2021 | Larsen ..................... G06F 1/20 |

FOREIGN PATENT DOCUMENTS

| | | |
|---|---|---|
| DE | 102008062430 B4 | 1/2011 |
| JP | H05-122890 A | 5/1993 |
| MX | 322254 B | 7/2014 |
| RU | 2672891 C2 | 11/2018 |
| WO | 2005/056975 A1 | 6/2005 |
| WO | 2005079134 A2 | 9/2005 |
| WO | 2006/055467 A1 | 5/2006 |
| WO | 2013/040401 A1 | 3/2013 |
| WO | 2016/205038 A1 | 12/2016 |
| WO | 2019/174691 A1 | 9/2019 |

OTHER PUBLICATIONS

Robbie Dickson, "Linear Actuators 101—Everything you need to know about Linear Actuators," Firgelli Automations, Nov. 16, 2018, 19 pgs, https://www.firgelliauto.com/blogs/news/linear-actuators-101.

"Carlos Gonzalez, ""What's the Difference Between Pneumatic, Hydraulic, and Electrical Actuators?"" Machine Design, Apr. 16, 2015, 5 pgs, https://www.machinedesign.com/mechanical-motion-systems/linear-motion/article/21832047/whats-the-difference-between-pneumatic-hydraulic-and-electrical-actuators".

International Search Report from PCT Application No. PCT/EP2021/056936 dated May 31, 2021, 1 pg.

International Search Report from PCT Application No. PCT/EP2021/056939 dated Jun. 28, 2021, 1 pg.

International Search Report from PCT Application No. PCT/EP2021/056938 dated Jul. 23, 2021, 1 pg.

OCTG API 5DP Pipe Specification (https://web.archive.org/web/20180628140443/https://www.mid-continents.com/drill-pipe), Archived Jun. 28, 2018 (Year: 2018).

* cited by examiner

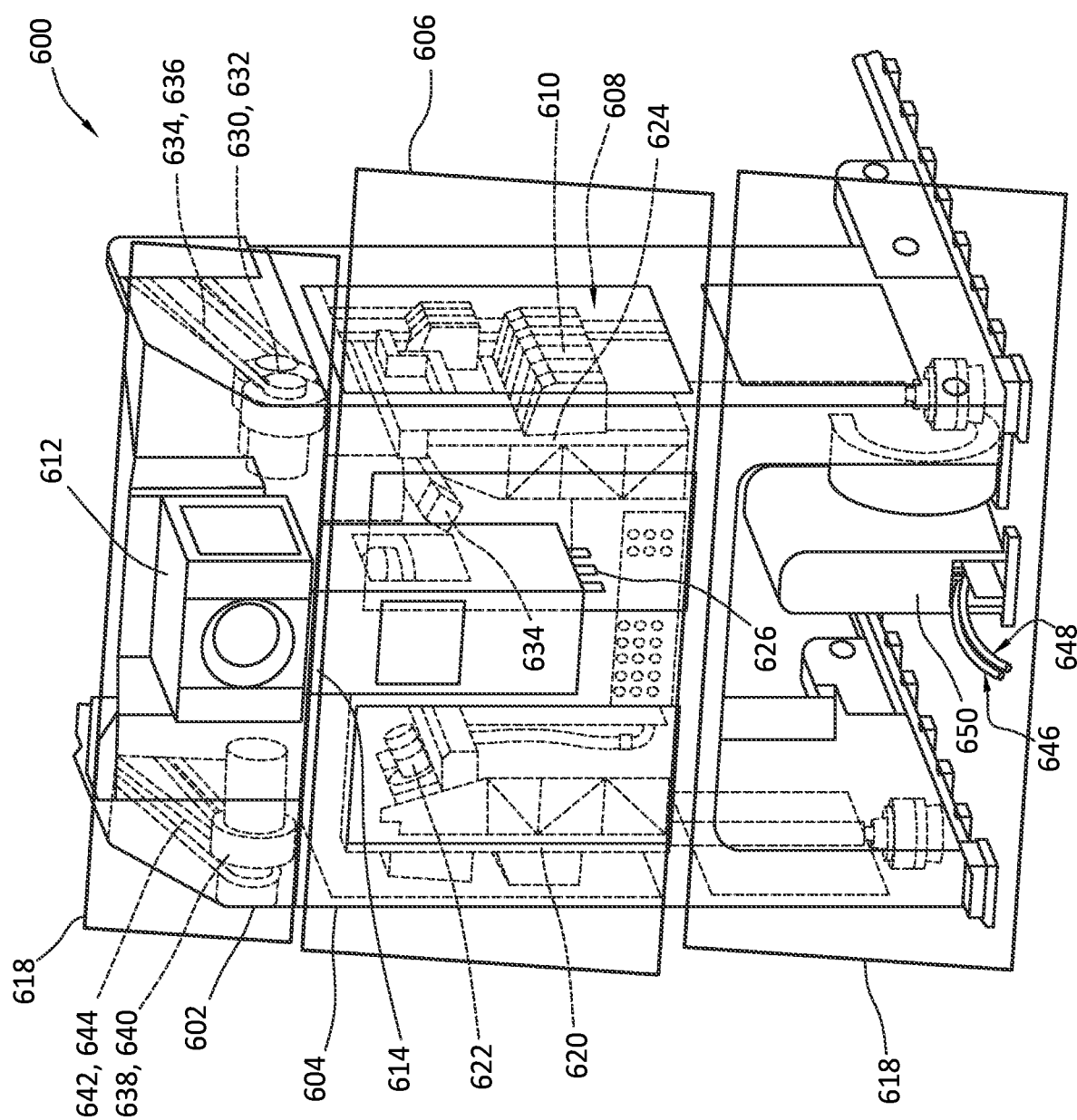

ROBOTIC SYSTEM INCLUDING AN INTERNAL COOLING SYSTEM

CROSS-REFERENCE TO RELATED APPLICATION(S)

This application claims priority under 35 U.S.C. § 119(e) to U.S. Patent Application No. 62/991,729, entitled "ROBOTIC SYSTEM INCLUDING AN INTERNAL COOLING SYSTEM," by Orjan Helgaland LARSEN, filed Mar. 19, 2020, which application is assigned to the current assignee hereof and incorporated herein by reference in its entirety.

BACKGROUND

Embodiments of the present disclosure relate generally to systems and methods for conducting subterranean processing operations. More particularly, present embodiments relate to systems and methods regarding explosive (EX)-certified robotic systems and that include internal cooling systems and that are adapted for accomplishing drilling or mining operations, such as the extraction and processing of water, oil, gas, and minerals.

Safety risks to personnel can be reduced by use of automated systems to conduct subterranean processing operations, particularly where such operations are conducted under hazardous conditions or in dangerous locations. A common operation during the drilling of subterranean wells involves assembling tubular strings, such as casing strings and drill strings, each of which comprises a plurality of elongated, heavy tubular segments extending downwardly from a drilling rig into a well bore. The tubular string consists of a number of tubular segments, which threadedly engage one another. Automated tubular (or pipe) handling machines, such as iron roughnecks, automated catwalks, tubular elevators, and pipe handlers, can be installed to operate on or near a rig floor to manage (or assist in management of) tubular segments as they are manipulated between storage areas and a wellbore. Such conventional automated tubular handling machines can reduce certain safety risks to personnel, but still suffer various shortcomings.

Therefore, there continues to be a need for improved articles, systems, and methods for conducting subterranean operations.

SUMMARY

A first aspect includes a robot for conducting a subterranean operation comprising: a main body comprising a housing; a controlled atmosphere volume disposed within the housing; an electrical component disposed within the controlled atmosphere volume; and a cooling system disposed in the housing, wherein at least a portion of the cooling system is disposed within the controlled atmosphere volume. The controlled atmosphere volume may comprise an EX-certified chamber. The EX-certified chamber may comprise an EX Zone 1 compliant device according to an ATEX certification, an IECEx certification, or a combination thereof. The cooling system may traverse the boundary of the controlled atmosphere volume. The cooling system may comprise a cooling unit and a heat sink. The heat sink may comprise a cold plate.

BRIEF DESCRIPTION OF THE DRAWINGS

The present disclosure can be better understood, and its numerous features and advantages made apparent to those skilled in the art by referencing the accompanying drawings.

FIG. 8 is an illustration of an embodiment of a robot for conducting a subterranean operation that includes at least a portion of a cooling system and a plurality of electrical components that are disposed within an EX-certified chamber that is located within the body of the robot, in accordance with certain embodiments; and The use of the same reference symbols in different drawings indicates similar or identical items.

DETAILED DESCRIPTION

Figure 1:
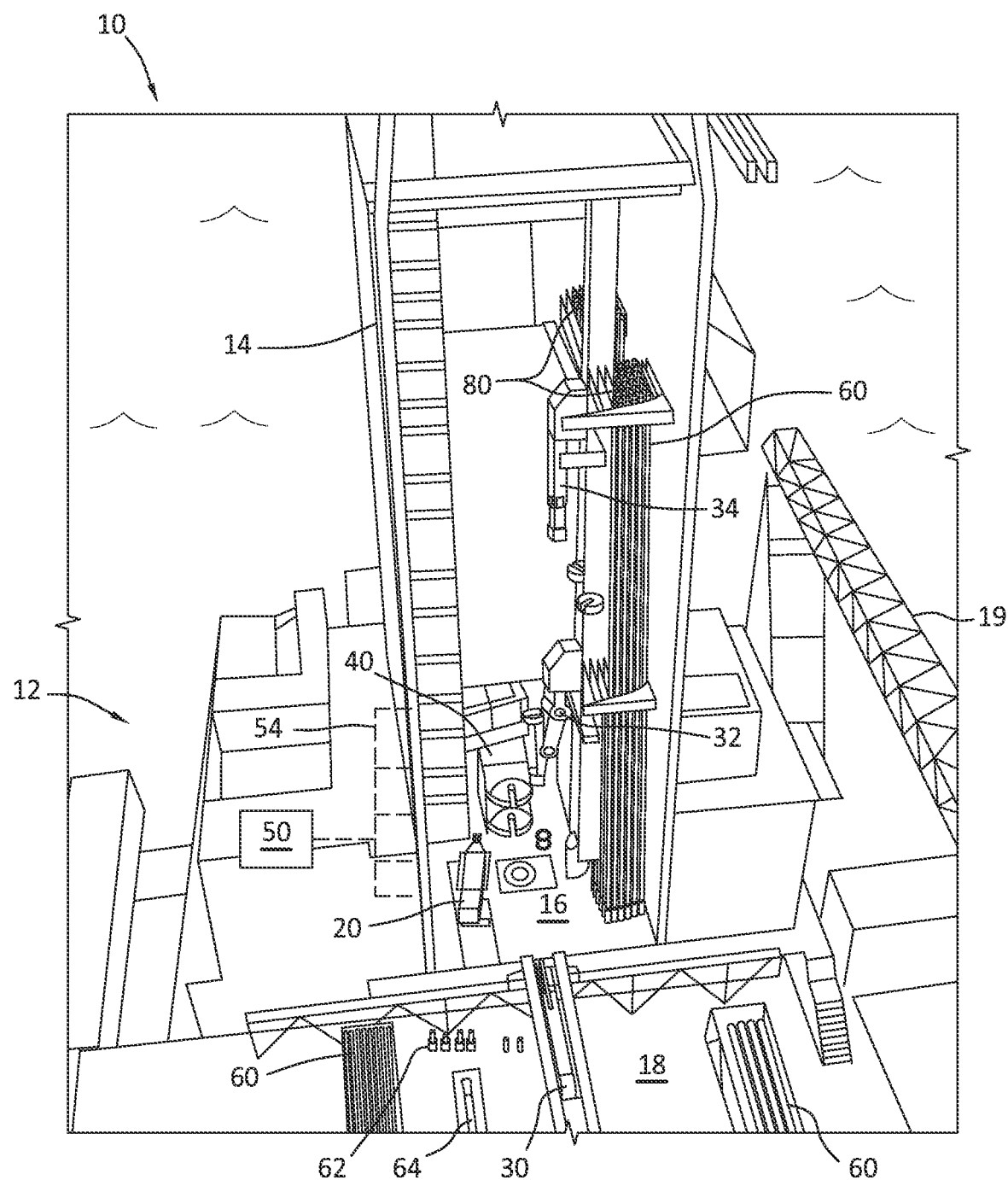
FIG. 1 is a representative view of a rig that can be used to perform subterranean operations, in accordance with certain embodiments.

The following description, in combination with the figures, is provided to assist in understanding the teachings disclosed herein. The following discussion will focus on specific implementations and embodiments of the teachings. This discussion is provided to assist in describing the teachings and should not be interpreted as a limitation on the scope or applicability of the teachings.

The term "averaged," when referring to a value, is intended to mean an average, a geometric mean, or a median value. As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. As used herein, the phrase "consists essentially of" or "consisting essentially of" means that the subject that the phrase describes does not include any other components that substantially affect the property of the subject.

Further, unless expressly stated to the contrary, "or" refers to an inclusive-or and not to an exclusive-or. For example, a condition A or B is satisfied by any one of the following:

A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Further, references to values stated in ranges include each and every value within that range. When the terms "about" or "approximately" precede a numerical value, such as when describing a numerical range, it is intended that the exact numerical value is also included. For example, a numerical range beginning at "about 25" is intended to also include a range that begins at exactly 25. Moreover, it will be appreciated that references to values stated as "at least about," "greater than," "less than," or "not greater than" can include a range of any minimum or maximum value noted therein.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and can be found in textbooks and other sources within the mining, drilling, and robotics arts.

Present embodiments provide a robot, robotic systems, and methods for conducting a subterranean operation. In some embodiments, a robot may include a hazardous atmosphere controlled area or volume, such as an EX-certified chamber, that is located within the body of the robot. In some embodiments, a robot may include a cooling system that is at least partially disposed to fully disposed within the body of the robot, such as partially to fully disposed within the chamber located within the body.

FIG. 1 is a representative view of a rig 10 that can be used to perform subterranean operations. The rig 10 is shown as an offshore rig, but it should be understood that the principles of this disclosure are equally applicable to onshore rigs as well. The example rig 10 can include a platform 12 with a derrick 14 extending above the platform 12 from the rig floor 16. The platform 12 and derrick 14 provide the general super structure of the rig 10 from which the rig equipment is supported. The rig 10 can include a horizontal storage area 18, pipe handlers 30, 32, 34, a drill floor robot 20, an iron roughneck 40, a crane 19, and fingerboards 80, as well as other equipment known to those skilled in the art. The equipment on the rig 10, can be communicatively coupled to a rig controller 50 via a network 54, with the network 54 being wired or wirelessly connected to the equipment.

Some of the equipment that can be used during subterranean operations is shown in the horizontal storage area 18 and the fingerboards 80, such as the tubulars 60, the tools 62, and the bottom hole assembly (BHA) 64. The tubulars 60 can include drilling tubular segments, casing tubular segments, and tubular stands that are made up of multiple tubular segments. The tools 62 can include centralizers, subs, slips, adapters, etc. The BHA 64 can include drill collars, instrumentation, and a drill bit, as well as other known equipment.

Figure 2:
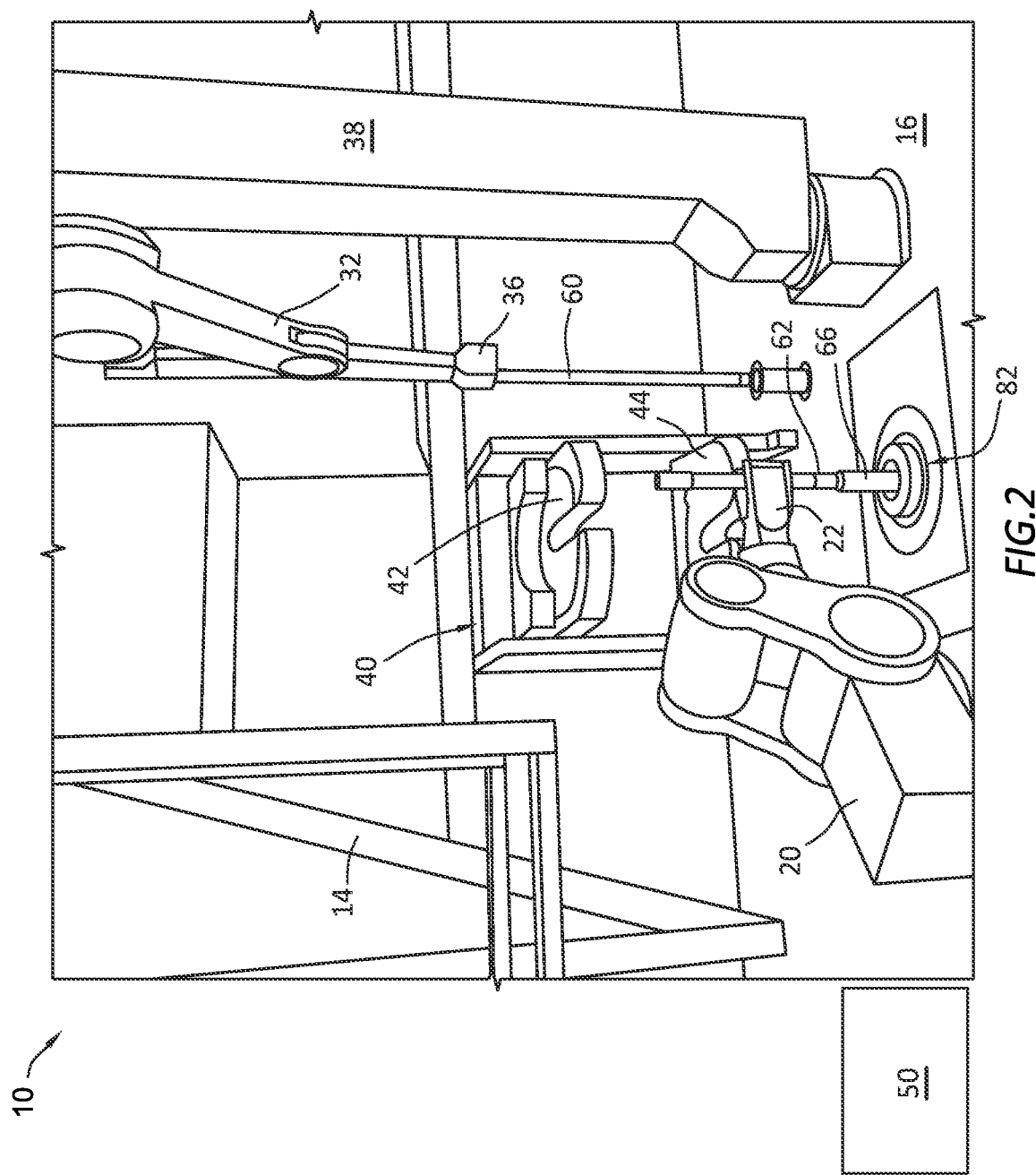
FIG. 2 is representative perspective view of robots that can be used on a drill floor of a rig during subterranean operations, in accordance with certain embodiments.

FIG. 2 is representative perspective view of some robots that can be used on a drill floor 16 of a rig 10 during subterranean operations. FIG. 2 shows a drill floor robot 20 gripping a tool 62 at the top end of the tubular string 66. The gripper 22 can engage the tool 62 and spin it off the top of the tubular string 66 in preparation for installing a tubular 60 to the end of the tubular string 66. The pipe handler 32 can engage a tubular 60 with the grippers 36 and move the tubular 60 from a storage location or the pipe handler 30 to a well center 82 where the pipe handler 32 can thread the tubular 60 onto the tubular string 66. The iron roughneck 40 can then torque the joint via torque wrench 42 and backup tong 44.

When tripping the tubular string 66 from the wellbore, the iron roughneck 40 can be used to break lose the joint via the wrenches 42, 44. The drill floor robot 20 (or other transport means, such as a mobile cart, robotic arm attached to drill floor 16, etc.) can also be used to move a mud bucket 100 between a storage location and a deployed location. For example, the gripper 22 of the drill floor robot 20 can be removed and the drill floor robot 20 connected, via tool interface, to a mud bucket 100 for collecting expelled fluid when a tubular joint is disconnected.

Figure 3:
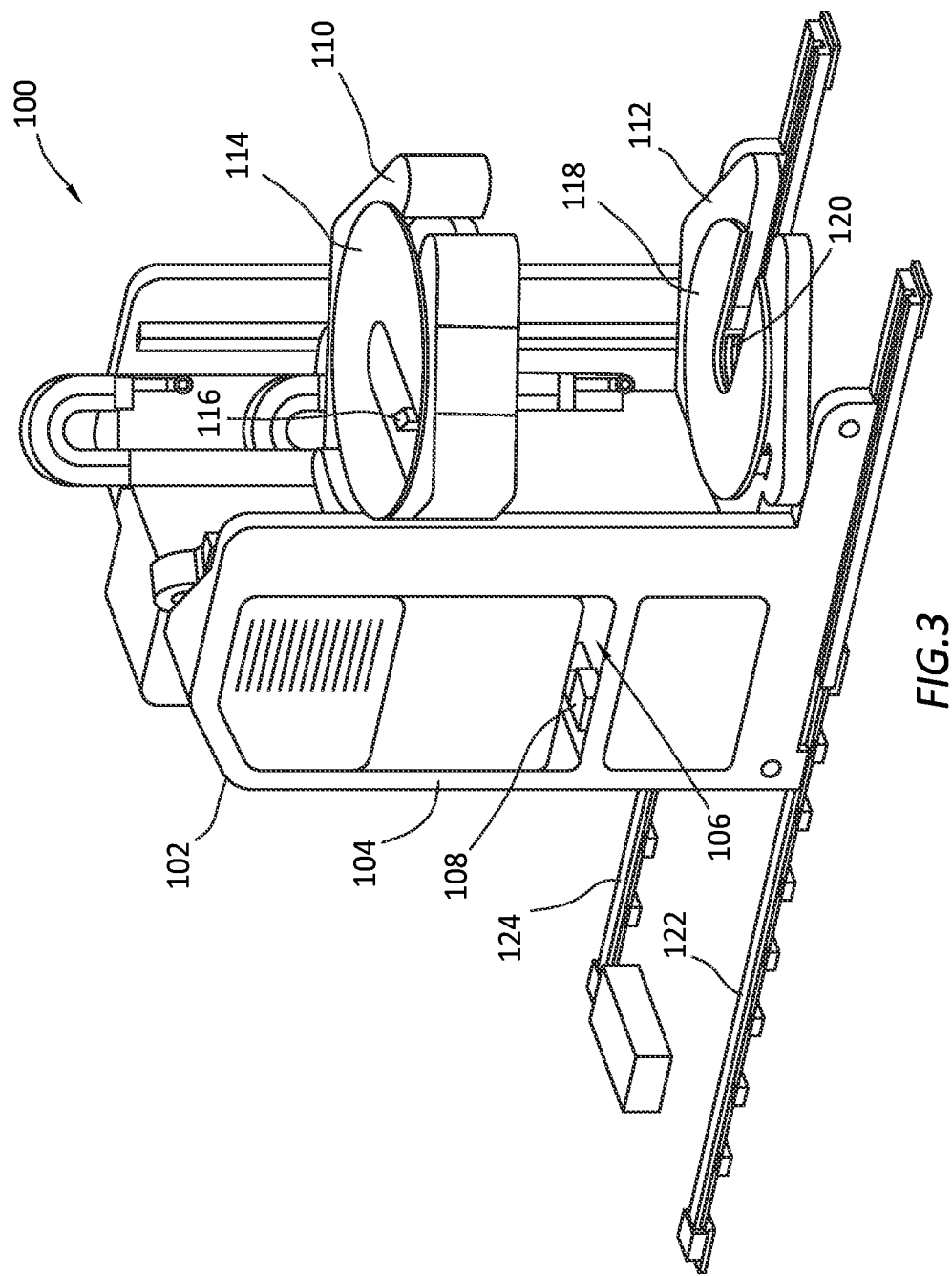
FIG. 3 is an illustration of an embodiment of a robot for conducting a subterranean operation that includes at least a portion of a cooling system disposed within an EX-certified chamber that is located within the body of the robot, in accordance with certain embodiments.

FIG. 3 shows an embodiment of a robot 100 (e.g., iron roughneck) for conducting a subterranean operation comprising a central body 102 with a housing 104. An EX-certified chamber 106, which may be externally accessible and resealable, is disposed within the central body. One or more electrical components 108 can be disposed within the EX-certified chamber 106. The robot 100 may further comprise a first tubular manipulation tool 110 or a second tubular manipulation tool 112 that are moveably attached to the central body 102. The first tubular manipulation tool 110 may comprise a powered tong, such as a torque wrench, that may include a rotation table 114 and clamps 116. The second tubular manipulation tool 112 may comprise a powered tong, such as a backup tong, that can include a rotation table 118 and clamps 120. The robot may further comprise a horizontal movement element, such as a first rail 122 or second rail 124, upon which the central body is moveably attached. It should be understood that that rotation table 118 may be configured to rotate with respect to the housing 104, but it can also be configured to be rotationally fixed to the housing 104 such that the rotation table 118 does not rotate relative to the housing 104.

Figure 4:
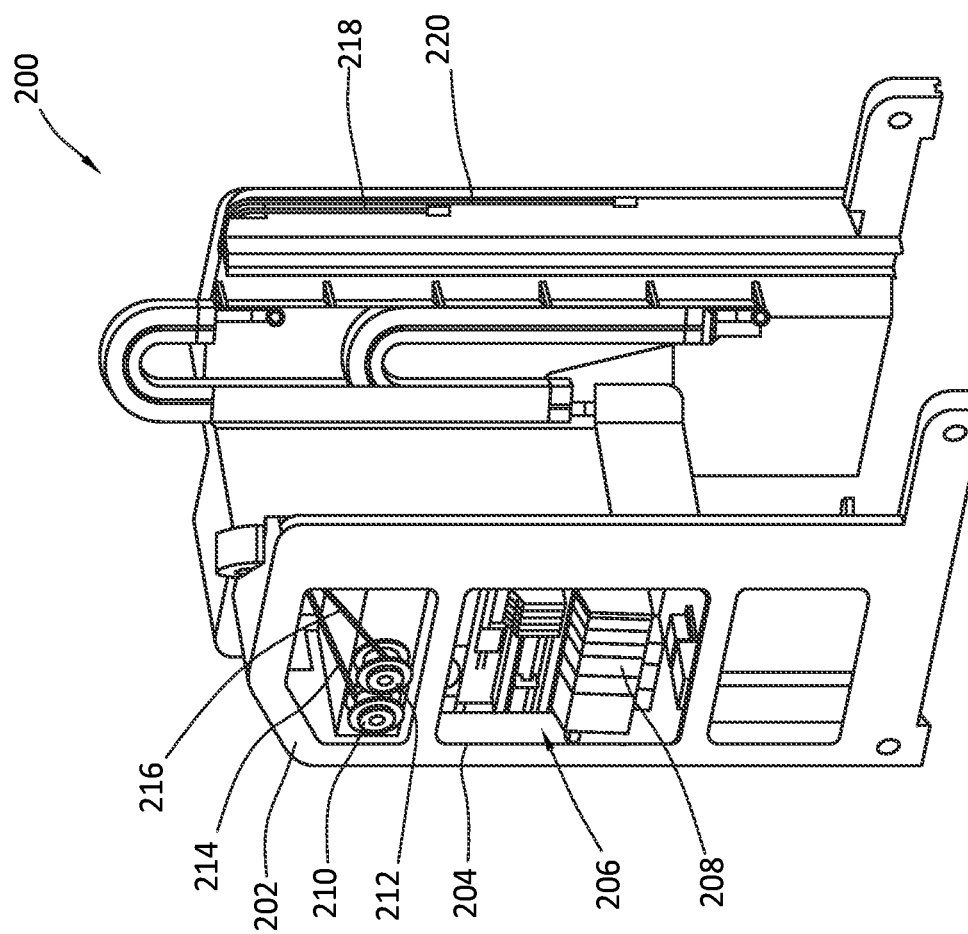
FIG. 4 is an illustration of an embodiment of a robot for conducting a subterranean operation that includes a plurality of electrical components disposed within a resealable EX-certified chamber that is located within the body of the robot, in accordance with certain embodiments.

FIG. 4 shows an embodiment of a robot 200 for conducting a subterranean operation comprising a central body 202 with a housing 204 and an EX-certified chamber 206 that is disposed within the central body. The EX-certified chamber 206 may be externally accessible and resealable. One or more electrical components 208 can be disposed within the EX-certified chamber 106. The robot 200 may further comprise a vertical movement system adapted to accomplish independent vertical movement of a first tubular manipulation tool (e.g., tool 110 in FIG. 1). In a specific embodiment, the vertical movement system may comprise a winch 210 connected to a flexible member 214 and another winch on an opposite side of robot 200 connected to a flexible member 218, and can provide for independent vertical movement of the first tubular manipulation tool (e.g., tool 110 in FIG. 1). In certain embodiments, the flexible members may comprise cables, belts, chains, wires, or a combination thereof. The vertical movement system may comprise additional vertical movement elements, such as a winch 212 connected to a flexible member 216 and another winch on an opposite side of robot 200 connected to a flexible member 220, and can provide for independent vertical movement of the second tubular manipulation tool (e.g., tool 112 in FIG. 1).

Figure 5:
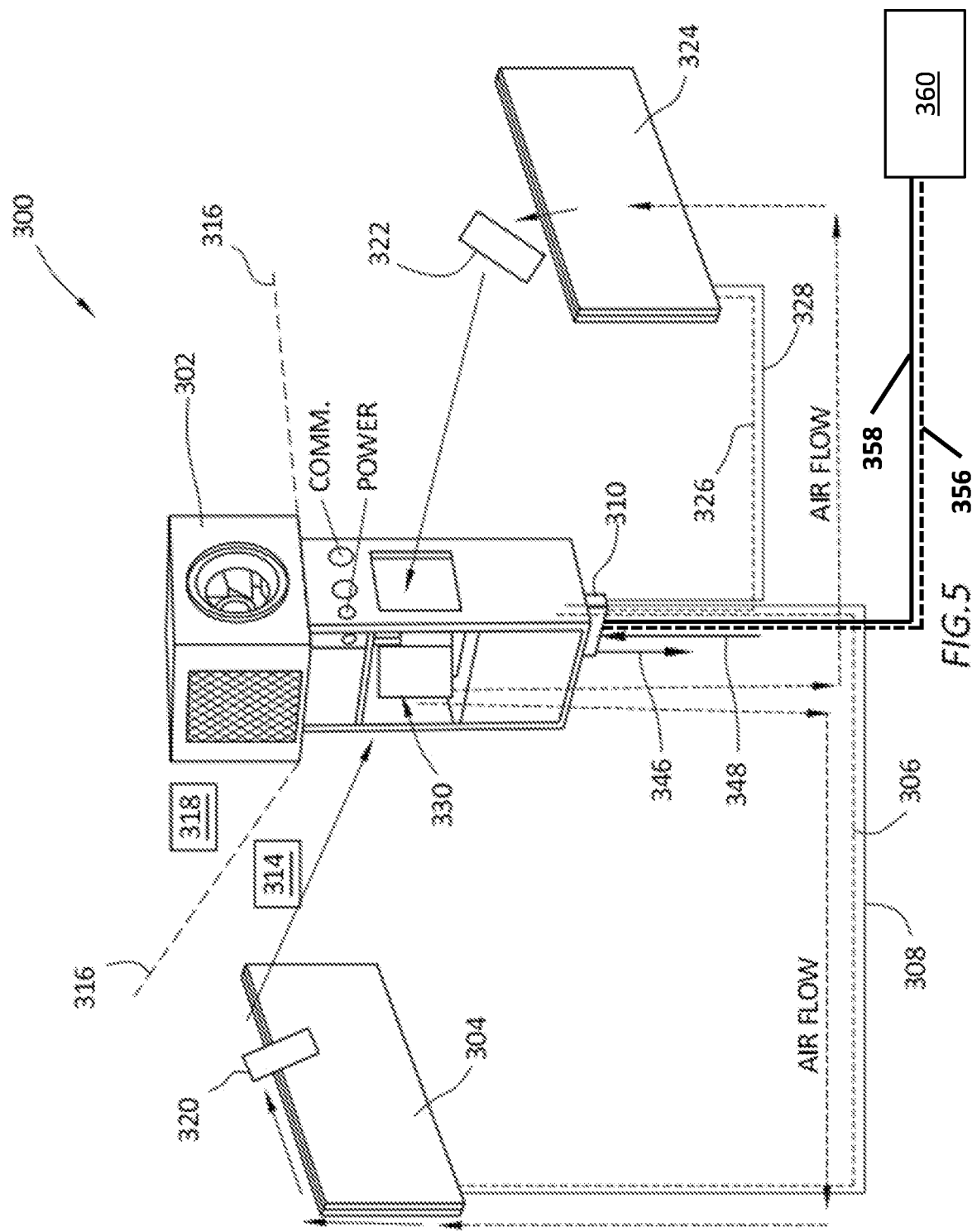
FIG. 5 is an illustration of a schematic of an embodiment of a cooling system that includes at least a portion of the cooling system, such as a portion of a cooling unit being disposed within a purged atmosphere area, such as an EX-certified area, and a portion of the cooling system being disposed in a non-purged area, in accordance with certain embodiments.

FIG. 5 shows a schematic of an embodiment of a cooling system for a robot that conducts subterranean operations. A cooling system 300 can comprise a cooling unit 302 (such as a refrigeration unit) and a heat sink (such as cold plate 304). The cold plate 304 may be connected to cooling unit 302 by a fluid circulation loop comprising a cool fluid line 306 and a hot fluid line 308 that are attached to a manifold 310 disposed on the cooling unit 302. An input fluid line 348 and an output fluid line 346 may be connected to the cooling unit 302 by attachment to manifold 310. The cooling unit 302 removes heat from the fluid entering the cooling unit 302 via the hot fluid line 308 and pumps the cooled fluid from the cooling unit 302 via the cool fluid line 306. The cooling unit 302 can include At least a portion of the cooling system 300, such as at least a portion of the cold plate 304, at least a portion of the fluid circulation loop (i.e., at least a portion of cool fluid line 306 or at least a portion of hot fluid line 308), at least a portion of the cooling unit 302, or a combination thereof are disposed within a controlled atmosphere volume 314 (also called herein a "purged" volume or a "purged" area) that is located within the robot 100, 200. In certain embodiments, the controlled atmospheric volume is located within the main body of the robot. The controlled atmosphere volume 314 may comprise an EX-certified chamber that is located within the robot.

The cooling unit 302 may traverse a boundary 316 between the controlled atmosphere volume 314 and a non-controlled atmosphere volume 318 (also called a "non-purged" area). The cooling system 300 may further comprise one or more fans, such as a fan 320 and fan 322. The fans may be disposed within the controlled atmosphere volume 314 so as to promote circulation of air over cold plate 304. Additionally, a second cold plate 324 may be connected to cooling unit 302 by a second fluid circulation loop comprising a cool fluid line 326 and a hot fluid line 328 attached to the manifold 310. Fan 322 may be disposed within the controlled atmosphere volume 314 so as to promote circulation of air over cold plate 324. In certain embodiments, fan 320, fan 322, or a combination thereof may be disposed or adapted so as to purge the atmosphere within the controlled atmosphere volume 314, such as at a specific rate. In a specific embodiment, fan 320 and fan 322 are disposed within the controlled atmosphere volume 314 so as to promote circulation of air over cold plate 304 and cold plate 324, respectively, as well as to purge the atmosphere within the controlled atmosphere volume 314. An additional fan 330 may be disposed in controlled atmosphere volume 314 in proximity to, or even within, the portion of cooling unit 302 that is disposed within controlled atmosphere volume 314 that is adapted to promote circulation of air over a heat exchanger (not shown) of the cooling unit 302. In a non-limiting embodiment, a second robot 360 may be connected to cooling unit 302 by a third fluid circulation loop comprising a cool fluid line 356 and a hot fluid line 358 attached to the manifold 310. Air flow can be provided by the second robot 360 to transfer heat to the third fluid circulation loop. The second robot 360 may be a drill floor robot 20, a pipe handler 30, 32, 34, or a combination thereof.

Figure 6:
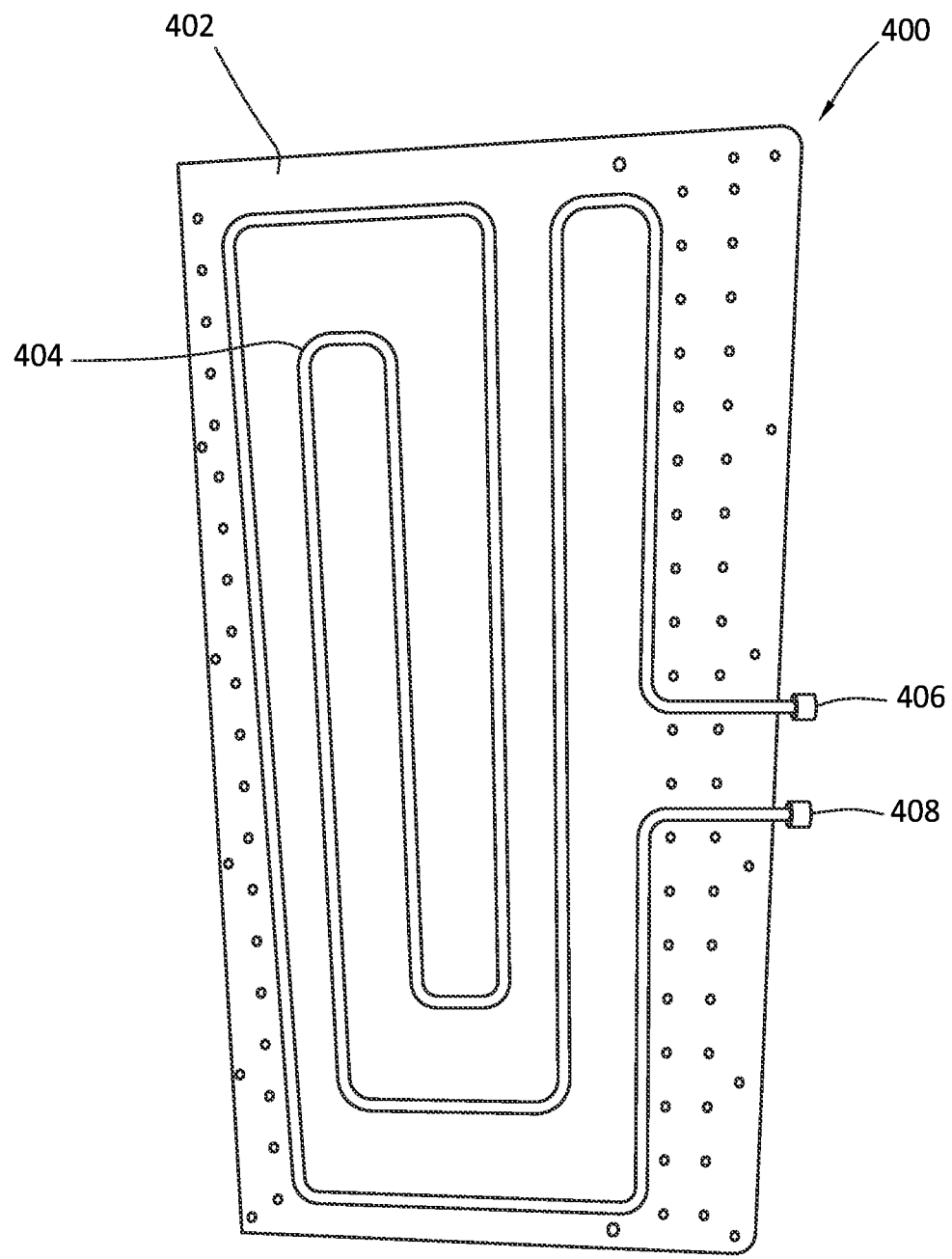
FIG. 6 is an image of an embodiment of a cold plate that includes an imbedded fluid line, in accordance with certain embodiments.

FIG. 6 shows an embodiment of a cold plate 400. The cold plate 400 may comprise a body 402 including a fluid line 404 disposed in contact with the body. The fluid line may be at least partially to fully embedded within the body 402. In a specific embodiment, the fluid line 404 may be disposed in a tortuous pattern. Fluid line 404 may comprise a first inlet/outlet 406 and a second inlet/outlet 408. For example, cold fluid can enter the fluid line 404 at the port 406, flow through the fluid line 404 as it is heated up by the heat transferred from the body 402, the heated fluid can then be exhausted from the port 408 to carry the heat from the body 402 to a cooling unit (e.g., 302).

Figure 7:
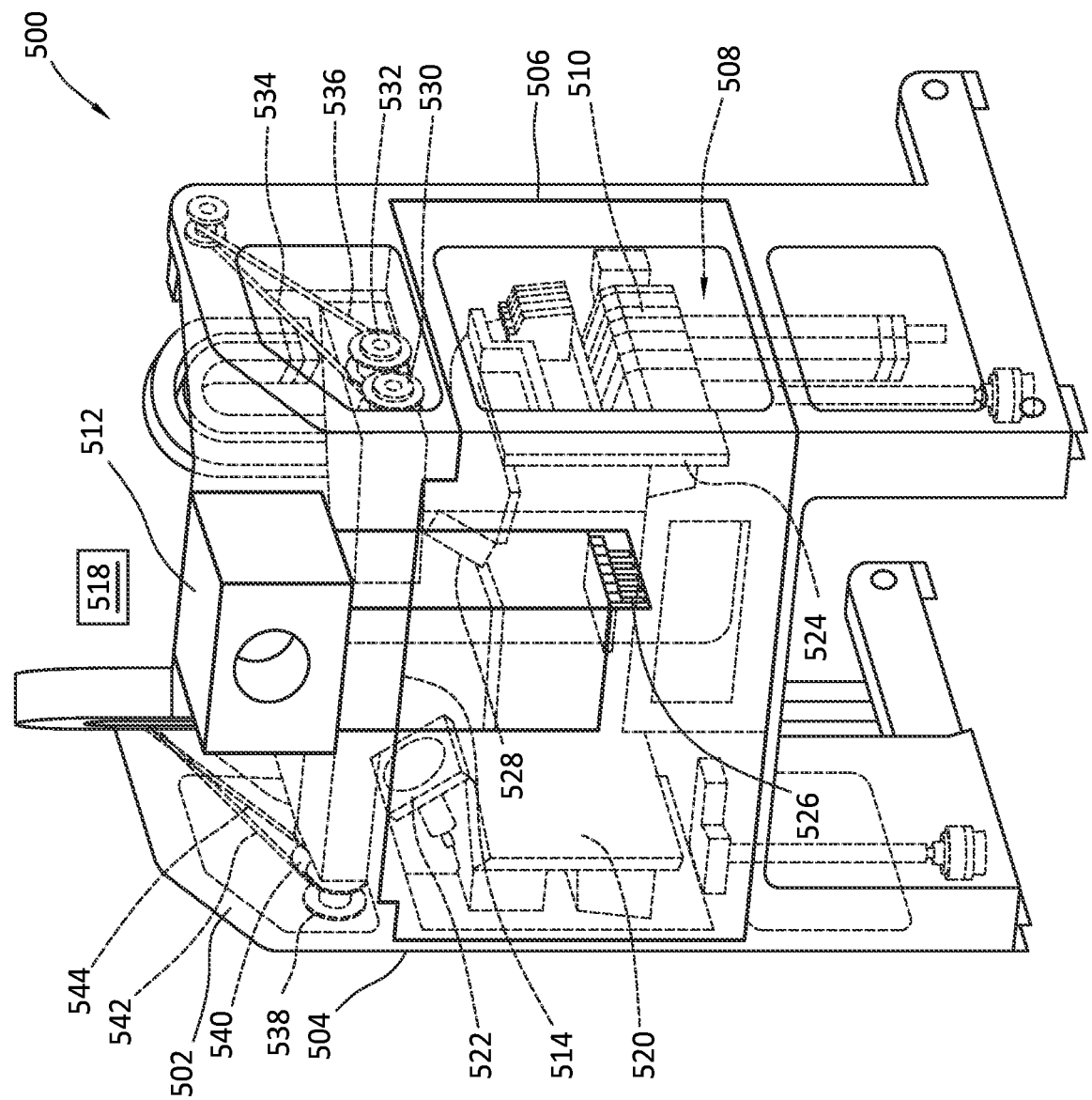
FIG. 7 is an illustration of an embodiment of a robot for conducting a subterranean operation that includes at least a portion of a cooling system and a plurality of electrical components that are disposed within an EX-certified chamber that is located within the body of the robot, in accordance with certain embodiments.

FIG. 7 shows an embodiment of a robot 500 for conducting a subterranean operation comprising a central body 502 comprising a housing 504. Disposed within the central body 502 is a controlled atmosphere volume 506. The controlled atmosphere volume may comprise an EX-certified chamber 508. The EX-certified chamber may be integral with the housing 504. The EX-certified chamber may be externally accessible and resealable. A one or more electrical components 510 may be disposed within the EX-certified chamber. At least a portion of a cooling system is disposed within the controlled atmosphere volume 506, such as in an EX-certified chamber, located within a body of the robot. In a specific embodiment, a cooling unit 512 is partially disposed within the controlled atmosphere volume 506 comprising an EX-certified chamber, such that the cooling unit traverses a boundary 514 between the controlled atmosphere volume 506 ("purged" area) and a non-controlled atmosphere volume 518 ("non-purged" area).

Also disposed within the EX-certified chamber are other components of the cooling system, including: a first cold plate 520; a first fluid circulation loop comprising a first cool fluid line (not shown) and a first hot fluid line (not shown); a first fan 522, a second cold plate 524; a second fluid circulation loop comprising a second cool fluid line (not shown) and a second hot fluid line (not shown), a second fan 528, or a combination thereof. In a specific embodiment, the first fluid circulation loop (i.e., the first cool fluid line and the first hot fluid line) may be attached to a manifold 526 disposed on the cooling unit 512. The first fan 522 and second fan 528 may be disposed within the EX-certified chamber so as to promote circulation of air over the cold plates 520, 524. One or more of the electrical components 510 may be disposed in contact with the cold plate 524.

The robot 500 may further comprise a vertical movement system adapted to accomplish independent vertical movement of a first tubular manipulation tool (e.g., tool 112 in FIG. 1). In a specific embodiment, the vertical movement system may comprise a pair of winches 530, 538 connected to a respective flexible member 534, 542, and can provide for independent vertical movement of the first tubular manipulation tool (e.g., tool 110 in FIG. 1). In certain embodiments, the flexible members may comprise cables, belts, chains, wires, or a combination thereof. The vertical movement system may comprise additional vertical movement elements, such as a pair of winches 532, 540 connected to a respective flexible member 536, 544, and can provide for independent vertical movement of the first tubular manipulation tool (e.g., tool 110 in FIG. 1).

FIG. 8 shows an embodiment of a robot 600 for conducting a subterranean operation comprising a central body 602 comprising a housing 604. Disposed within the central body 602 is a controlled atmosphere volume 606. The controlled atmosphere volume may comprise an EX-certified chamber 608. The EX-certified chamber may be integral with the housing 604. The EX-certified chamber may be externally accessible and resealable. A one or more electrical components 610 may be disposed within the EX-certified chamber. At least a portion of a cooling system is disposed within the controlled atmosphere volume 606, such as in an EX-certified chamber, located within a body of the robot.

In a specific embodiment, a cooling unit 612 is partially disposed within the controlled atmosphere volume 606 comprising an EX-certified chamber, such that the cooling unit traverses a boundary 614 between the controlled atmosphere volume 606 ("purged" area) and a non-controlled atmosphere volume 618 ("non-purged" area). Also disposed within the EX-certified chamber can be other components of the cooling system, including: a first cold plate 620; a first fluid circulation loop comprising a first cool fluid line (not shown, see previous example) and a first hot fluid line (not shown, see previous example); a first fan 622, a second cold plate 624; a second fluid circulation loop comprising a second cool fluid line (not shown, see previous example) and a second hot fluid line (not shown, see previous example), and a second fan 628. The first fluid circulation loop (i.e., the first cool fluid line (not shown, see previous example) and the first hot fluid line (not shown, see previous example) may be attached to a manifold 626 disposed on the cooling unit 612. External input fluid line 648 and external output fluid line 646 may be connected to junction box 650. An input fluid line (not shown, see previous example) and an output fluid line (not shown, see previous example) may be connected to the cooling unit 612 by attachment to manifold 636. The fans 622, 628 may be disposed within the EX-certified chamber 106 so as to promote circulation of air over the cold plates 620, 624. One or more of the electrical components 610 may be disposed in contact with the cold plate 620.

The robot 600 may further comprise a vertical movement system adapted to accomplish independent vertical movement of a first tubular manipulation tool (e.g., tool 112 in FIG. 1). In a specific embodiment, the vertical movement system may comprise a pair of winches 630, 638 connected to a respective flexible member 634, 642, and can provide for independent vertical movement of the first tubular manipulation tool (e.g., tool 110 in FIG. 1). In certain embodiments, the flexible members may comprise cables, belts, chains, wires, or a combination thereof. The vertical movement system may comprise additional vertical movement elements, such as a pair of winches 632, 640 connected to a respective flexible member 636, 644, and can provide for independent vertical movement of the first tubular manipulation tool (e.g., tool 110 in FIG. 1).

Housing

The robot (e.g., 100, 200, 500, 600) may comprise a body (e.g., 102, also referred to herein as a "central body" or "main body"). The central body may comprise a housing (e.g., 104, also referred to herein as a "chassis"). The housing is adapted to enclose an internal component of the robot within the body of the robot. The housing may enclose one or more spaces, volumes, cavities, chambers, or a combination thereof. The one or more spaces, volumes, cavities, chambers, or a combination thereof may be integral with the housing, separate from the housing, or a combination thereof. The housing may comprise a cover, a covering, a shell, a container, an enclosure, a framework (i.e., "frame"), or a combination thereof.

The housing may be comprised of materials or combinations of materials that are suitable for the robot to safely operate in a hazardous environment. Hazardous environments include flammable environments, explosive environments, corrosive environments, or a combination thereof.

Controlled Atmosphere/Non-Controlled Atmosphere

The robot may comprise a controlled atmosphere volume. As used herein a "controlled atmosphere volume" (also referred to herein as a "purged volume" or "purged area") will be understood to refer to a volume of space within the body of the robot, such as a specific area within the robot, where the atmosphere is controlled to reduce the risk of fire, explosion, corrosion, or a combination thereof. The controlled atmosphere volume may comprise an atmosphere that has a reduced risk of explosion. The reduced risk can meet an accepted standard, such as the ATEX and IECEx standards for hazardous areas. The controlled atmosphere volume may comprise an atmosphere conforming to the ATEX or IECEx standards for hazardous areas (also referred to herein as an "EX-certified" atmosphere).

EX-Certified Chamber

The robot may comprise an EX-certified chamber disposed within the body of the robot, such as within the housing of the robot. As referred to herein, an EX-certified chamber refers to a specified volume within the body of the robot, such as in a specified space, volume, cavity, chamber, or a combination thereof, that contains an atmosphere having a reduced hazard risk meeting the ATEX and IECEx standards for hazardous areas. ATEX is an abbreviation for "Atmosphere Explosible". IECEx stands for the certification by the International Electrotechnical Commission for Explosive Atmospheres. In other words, a volume or chamber within the robot containing an explosive (EX)-certified atmosphere and capable of containing an EX-certified atmosphere is an EX-certified chamber. In a specific embodiment, an EX-certified chamber comprises an EX Zone 1 compliant device according to an ATEX certification, an IECEx certification, or a combination thereof.

Two standards (ATEX and IECEx) are generally synonymous with each other and provide guidelines (or directives) for equipment design. Each standard identifies groupings of multiple EX zones to indicate various levels of hazardous conditions in a target area.

One grouping is for areas with hazardous gas, vapor, or mist concentrations.

EX Zone 0—A place in which an explosive atmosphere consisting of a mixture with air of dangerous substances in the form of gas, vapor or mist is present continuously or for long periods or frequently.

EX Zone 1—A place in which an explosive atmosphere consisting of a mixture with air of dangerous substances in the form of gas, vapor or mist is likely to occur in normal operation occasionally.

EX Zone 2—A place in which an explosive atmosphere consisting of a mixture with air of dangerous substances in the form of gas, vapor or mist is not likely to occur in normal operation but, if it does occur, will persist for a short period only.

Another grouping is for areas with hazardous powder or dust concentrations.

EX Zone 20—A place in which an explosive atmosphere in the form of a cloud of combustible dust in air is present continuously, or for long periods or frequently.

EX Zone 21—A place in which an explosive atmosphere in the form of a cloud of combustible dust in air is likely to occur in normal operation occasionally.

EX Zone 22—A place in which an explosive atmosphere in the form of a cloud of combustible dust in air is not likely to occur in normal operation but, if it does occur, will persist for a short period only.

The Zone normally associated with the oil and gas industry is the EX Zone 1. Therefore, the explosive atmosphere directives or guidelines for robotic systems used in subterranean operations can be for an EX Zone 1 environment. Explosive atmosphere directives or guidelines for other EX Zones can be used also (e.g., EX Zone 21). However, the EX Zone 1 and possibly EX Zone 21 seem to be the most applicable explosive atmosphere directives or guidelines for the oil and gas industry. ATEX is the name commonly given to two European Directives for controlling explosive atmospheres:

1) Directive 99/92/EC (also known as 'ATEX 137' or the 'ATEX Workplace Directive') on minimum requirements for improving the health and safety protection of workers potentially at risk from explosive atmospheres; and
2) Directive 94/9/EC (also known as 'ATEX 95' or 'the ATEX Equipment Directive') on the approximation of the laws of Member States concerning equipment and protective systems intended for use in potentially explosive atmospheres.

Therefore, as used herein "ATEX certified" indicates that the article (such as an elevator or pipe handling robot) meets the requirements of the two stated directives ATEX 137 and ATEX 95 for EX Zone 1 environments. IECEx is a voluntary system which provides an internationally accepted means of proving compliance with IEC standards. IEC standards are used in many national approval schemes and as such, IECEx certification can be used to support national compliance, negating the need in most cases for additional testing. Therefore, as used herein, "IECEx certified" indicates that the article (such as an elevator or pipe handling robotic system) meets the requirements defined in the IEC standards for EX Zone 1 environments. As used herein, "EX Zone 1 certified (or certification)" refers to ATEX certification, IECEx certification, or both for EX Zone 1 environments.

Robotic systems tend to not have electrical equipment positioned in the hazardous zones because of the increased probability of sparking due to voltage potentials. Instead, electrical equipment or components such as used in the robotic systems are generally placed outside of the hazardous zone while mechanical equipment under hydraulic control operates within the hazardous zone.

An additional concern for equipment operating within the hazardous zone is corrosion. If a robotic system includes electrical equipment operating within the hazardous zone, corrosion of the equipment can further increase sparking potential by exposing parts of the equipment that were properly protected when the equipment was first deployed, as well as causing direct or indirect damage to the electrical components of the system.

Electrical Components

The robot may include an electrical component, or a plurality of electrical components, that can be disposed within the body of the robot (e.g., disposed within the controlled atmosphere volume). The electrical component may include a controller that controls a function of the robot. In a specific embodiment, the controller may include an electronic controller. An electrical component may include an electrical motor, an electrical actuator, an electrical switch, an electronic controller, a microprocessor, a programmable logic device, a programmable logic controller (PLC), a relay, a resistor, a capacitor, an inductor, a switch, a memory device, a network interface component (optical, electrical, etc.), an energy convertor, a printed circuit board (PCB), PCB mountable components, optical interface devices, electrical wiring, and combinations thereof. An electrical component may include a PLC, a remote controller, an input-output (I/O) device, a transceiver, an antenna, a printed circuit board, a computer processing unit (CPU), a cable connection, a computer-readable medium, or a combination thereof. A computer readable medium may include any suitable memory for storing instruction, such as read-only memory (ROM), random access memory (RAM), flash memory, an electrically erasable programmable ROM (EEPROM), or a combination thereof.

Cooling System

A robot for conducting a subterranean operation may include a cooling system disposed within the robot. The cooling system may be disposed fully or partially within the robot, such as partially or fully within a housing of the robot, or partially or fully within an EX-certified chamber within the robot. At least a portion of the cooling system can be disposed within the EX-certified chamber. In a specific embodiment, a cooling unit may be partially disposed within a controlled atmosphere volume, such as an EX-certified chamber, wherein the cooling unit can traverse a boundary between the controlled atmosphere volume ("purged" area) and a non-controlled atmosphere volume ("non-purged" area).

The cooling system may include: a cooling unit, a cold plate; a fluid circulation loop comprising a cool fluid line and a hot fluid line, a fan, or a combination thereof. The cooling system may include a second cold plate; a second fluid circulation loop comprising a second cool fluid line and a second hot fluid line, and a second fan, or a combination thereof. The cooling unit may include a manifold adapted to connect to the first fluid circulation loop or second fluid circulation loop to first cold plate or the second cold plate. The fan or fans may be disposed so as to promote circulation of air over one or both of the cold plates. A fan or fans may be disposed or adapted so as to purge the atmosphere within the controlled atmosphere volume, such as at a specific rate. A first fan or a second fan may be disposed within the controlled atmosphere volume so as to promote circulation of air over a first cold plate and a second cold plate, respectively, as well as to purge the atmosphere within the controlled atmosphere volume. A fan may be disposed in the controlled atmosphere volume in proximity to, or even within, the portion of the cooling unit that is disposed within the controlled atmosphere volume so that it is adapted to promote circulation of air over a radiator of the cooling unit. One or more of the electrical components as described herein may be disposed in contact with at least one cold plate.

The cooling system may include a fluid cooling system, such as a chilling system or a refrigeration system. A fluid cooling system may include a cooling unit, a coolant, a compressor, a condenser, an evaporator, a coolant pump, a refrigerant, a radiator, a manifold, a cold plate, or a combination thereof. The coolant, the compressor, the condenser, the evaporator, the coolant pump, the refrigerant, the radiator, the manifold, the cold plate, or a combination thereof can be disposed within the EX-certified chamber. In a specific embodiment, the cold plate is disposed in contact with an electrical component (e.g., a printed circuit board PCB). The coolant can flow through the manifold, the cold plate, or a combination thereof. In a specific embodiment, the coolant flows through the manifold and the cold plate. The coolant may include a suitable fluid. In an embodiment, the coolant may include water, ethylene glycol, or a combination thereof. In certain embodiments, the fluid cooling system may further include a dew-point sensor, a temperature sensor, a pressure sensor, or a combination thereof. In a specific embodiment, the cooling system may include a continuous water chiller system.

The cooling system may have a specific cooling capacity. The cooling system may have a cooling capacity of at least 0.5 kilowatts (kW), such as at least 1 kW, at least 3 kW, at least 5 kW, at least 7 kW, at least 9 kW, or at least 11 kW. The cooling system may have a cooling capacity of not greater than 100 kilowatts (kW), such as not greater than 80 kW, not greater than 60 kW, not greater than 40 kW, or not greater than 20 kW. The cooling capacity can be within a range comprising any pair of the previous upper and lower limits. In a particular embodiment, the cooling capacity may include not less than 0.5 kW to not greater than 100 kW, such as not less than 1 kW to not greater than 80 kW.

The cooling system may be attached to and provide cooling to a second robot, such as an additional robot for conducting a subterranean operation. A first robot for conducting a subterranean operation can include a cooling system that is disposed within the first robot and coupled to a second robot (which can support conducting a subterranean operation), wherein the cooling system provides cooling to the first robot or the second robot. In a specific embodiment, such as shown in FIGS. 1 and 2, the first robot may be an iron roughneck 40, the second robot may be a drill floor robot 20, a pipe handler 30, 32, 34, or a combination thereof. The second robot is separate and distinct from the first robot, except that they can be coupled via power and cooling lines.

Where a second robot is attached, the cooling system may provide a specific percentage of cooling capacity for the second robot. The cooling system may provide cooling capacity for a second robot in an amount of not less than 1%, such as not less than 3%, not less than 5%, not less than 10%, not less than 20%, not less than 25%, or not less than 30%. The cooling system may provide cooling capacity for a second robot in an amount of not greater than 60%, such as not greater than 50%, not greater than 45%, not greater than 40%, not greater than 30%, or not greater than 25%. The amount of cooling capacity can be a range comprising any pair of the previous upper and lower limits. In a particular embodiment, the cooling system may provide cooling capacity for a second robot in an amount of not less than 1% to not greater than 50%.

Electro-Mechanical Robot

A robot for conducting a subterranean operation may be a substantially (i.e., greater than 90%) to completely (i.e., 100%) electro-mechanically controlled system, a substantially (i.e., greater than 90%) to completely (i.e., 100%) electro-mechanically powered system, or a combination thereof. The robot can include a completely electro-mechanically powered system. As used herein, substantially to completely electro-mechanically controlled or substantially to completely electro-mechanically powered means that the robot functions are substantially (i.e., greater than 90%) to completely (i.e., 100%) controlled or powered without the use of a hydraulic system connected to the robot. The robot can be a substantially to completely electrically powered motor system. The robot can be a substantially to completely electrically powered actuator system.

Tool Manipulation System

The robot may include an automated tubular manipulation system. The automated tubular manipulation system may include a tong, an automated torque wrench, an automated backup tong, an automated gripper, an automated spinner, an automated clamp, an automated pipe handler, an automated tubular handler, or a combination thereof.

Types of Robot

The robot may include a particular type of robot for accomplishing a particular type of subterranean operation or a combination of subterranean operations. The robot may include an iron roughneck, a drill floor robot, a multi-size elevator, a pipe handler, a tubular handler, a racking system, or a combination thereof.

EMBODIMENTS

Embodiment 1

A robot for conducting a subterranean operation comprising:
a main body comprising a housing;
a controlled atmosphere volume disposed within the housing;
an electrical component disposed within the controlled atmosphere volume; and
a cooling system disposed in the housing, wherein at least a portion of the cooling system is disposed within the controlled atmosphere volume.

Embodiment 2

The robot of embodiment 1, wherein the controlled atmosphere volume comprises an EX-certified chamber.

Embodiment 3

The robot of embodiment 2, wherein the EX-certified chamber comprises an EX Zone 1 compliant device according to an ATEX certification, an IECEx certification, or a combination thereof.

Embodiment 4

The robot of embodiment 1, wherein the cooling system traverses the boundary of the controlled atmosphere volume.

Embodiment 5

The robot of embodiment 1, wherein the cooling system comprises a cooling unit and a heat sink.

Embodiment 6

The robot of embodiment 5, wherein the heat sink comprises cold plate.

Embodiment 7

The robot of embodiment 6, wherein the cold plate is connected to the cooling unit a fluid circulation loop comprising a cool fluid line and a hot fluid line.

Embodiment 8

The robot of embodiment 7, wherein the fluid circulation loop is attached to a manifold that is disposed on the cooling unit.

Embodiment 9

The robot of embodiment 8, wherein at least a portion of the cold plate, at least a portion of the fluid circulation loop, at least a portion of the cooling unit, or a combination thereof are disposed within the controlled atmosphere volume.

Embodiment 10

The robot of embodiment 9, wherein the cooling unit traverses a boundary between the controlled atmosphere volume and a non-controlled atmosphere volume.

Embodiment 11

The robot of embodiment 10, wherein the cooling system further comprises a fan.

Embodiment 12

The robot of embodiment 11, wherein the fan is disposed within the controlled atmosphere volume so as to promote circulation of air over the cold plate.

Embodiment 13

The robot of embodiment 10, wherein the fan is disposed or adapted so as to purge the atmosphere within the controlled atmosphere volume.

Embodiment 14

The robot of embodiment 4, wherein the cooling system comprises a fluid cooling system.

Embodiment 15

The robot of embodiment 14, wherein the fluid cooling system comprises: a cooling unit, a coolant, a manifold disposed on the cooling unit, a fluid circulation loop comprising a cool line and a hot line, a cold plate, or a combination thereof.

Embodiment 16

The robot of embodiment 15, wherein the cooling unit comprises a compressor, a condenser, an evaporator, a radiator, a refrigerant, or a combination thereof.

Embodiment 17

The robot of embodiment 16, wherein the compressor, the evaporator, the radiator, the manifold, the cold plate, a fluid circulation loop, or a combination thereof are disposed within the controlled atmosphere volume.

Embodiment 18

The robot of embodiment 15, wherein the cold plate is disposed in contact with the electrical component.

Embodiment 19

The robot of embodiment 15, wherein the coolant flows through the manifold, the cold plate, or a combination thereof.

Embodiment 20

The robot of embodiment 19, wherein the coolant flows through the manifold and the cold plate.

Embodiment 21

The robot of embodiment 15, wherein the coolant comprises water, ethylene glycol, or a combination thereof.

Embodiment 22

The robot of embodiment 15, wherein the fluid cooling system further comprises a dew-point sensor, a temperature sensor, a pressure sensor, or a combination thereof.

Embodiment 23

The robot of embodiment 1, wherein the cooling system has a cooling capacity of at least 0.5 kilowatts (kW), such as at least 1 kW, at least 3 kW, at least 5 kW, at least 7 kW, at least 9 kW, or at least 11 kW.

Embodiment 24

The robot of embodiment 1, wherein the cooling system has a cooling capacity of not greater than 100 kilowatts, such as not greater than 80 kW, not greater than 60 kW, not greater than 40 kW, or not greater than 20 kW.

Embodiment 25

The robot of embodiment 1, wherein the cooling system comprises a continuous water chiller system.

Embodiment 26

The robot of embodiment 1, wherein the cooling system is attached to a second robot.

Embodiment 27

The robot of embodiment 26, wherein the cooling system provides cooling to the robot, the second robot, or a combination thereof.

Embodiment 28

The robot of embodiment 27, wherein the robot comprises an iron roughneck, the second robot comprises a drill floor robot, or a combination thereof.

Embodiment 29

The robot of embodiment 26, wherein the cooling system provides cooling capacity for the second robot in an amount of not less than 1%.

Embodiment 30

The robot of embodiment 26, wherein the cooling system provides cooling capacity for the second robot in an amount of not greater than 50%.

Embodiment 31

The robot of embodiment 1, wherein the electrical component comprises an electrical motor, an electrical actuator, an electrical switch, an electronic controller, a microprocessor, a programmable logic device, a programmable logic controller (PLC), a relay, a resistor, a capacitor, an inductor, a switch, a memory device, a network interface component, an energy convertor, a printed circuit board (PCB), a PCB mountable component, an optical interface device, an electrical wiring, or a combination thereof.

Embodiment 32

The robot of embodiment 31, wherein an electrical component comprises a PLC, a remote controller, an input-output (I/O) device, a transceiver, an antenna, a printed circuit board, a computer processing unit (CPU), a cable connection, a computer-readable medium, or a combination thereof.

Embodiment 33

The robot of embodiment 31, wherein the electronic controller controls a function of the robot.

Embodiment 34

The robot of embodiment 1, further comprising a motor disposed within the controlled atmosphere volume.

Embodiment 35

The robot of embodiment 1, wherein the robot comprises a substantially electro-mechanically controlled system, a substantially electro-mechanically powered system, or a combination thereof.

Embodiment 36

The robot of embodiment 1, wherein the robot comprises a completely electro-mechanically controlled system, a completely electro-mechanically powered system, or a combination thereof.

Embodiment 37

The robot of embodiment 1, wherein the robot comprises a completely electrically powered motor system, a completely electrically powered actuator system, or a combination thereof.

Embodiment 38

The robot of embodiment 1, further comprising an automated tubular manipulation system.

Embodiment 39

The robot of embodiment 38, wherein the automated tubular manipulation system comprises a tong, an automated torque wrench, an automated backup tong, an automated gripper, an automated spinner, an automated clamp, an automated pipe handler, an automated tubular handler, or a combination thereof.

Embodiment 40

The robot of embodiment 1, wherein the robot comprises an iron roughneck, a drill floor robot, a multi-size elevator, a pipe handler, a tubular handler, a racking system, or a combination thereof.

Embodiment 41

A robot for conducting a subterranean operation comprising:
 a main body comprising a housing;
 a controlled atmosphere volume disposed within the housing;
 an electrical component disposed within the controlled atmosphere volume; and
 a cooling system disposed in the housing, wherein at least a portion of the cooling system is disposed within the controlled atmosphere volume.

Embodiment 42

The robot of embodiment 41, wherein the controlled atmosphere volume is configured to be Atmosphere Explosible (ATEX) certified or International Electrotechnical Commission for Explosive Atmospheres (IECEx) certified according to explosive (EX) Zone 1 requirements.

Embodiment 43

The robot of embodiment 41, wherein the cooling system traverses a boundary between the controlled atmosphere volume and a non-controlled atmosphere volume.

Embodiment 44

The robot of embodiment 43, wherein the cooling system comprises a cooling unit and a heat sink.

Embodiment 45

The robot of embodiment 44, wherein the heat sink comprises a cold plate and the cold plate transfers heat from the cold plate to a fluid circulation loop, and wherein the fluid circulation loop transfers the heat from the cold plate to the cooling unit.

Embodiment 46

The robot of embodiment 45, wherein at least a portion of the cold plate, at least a portion of the fluid circulation loop, at least a portion of the cooling unit, or a combination thereof are disposed within the controlled atmosphere volume.

Embodiment 47

The robot of embodiment 46, wherein the cooling unit traverses a boundary between the controlled atmosphere volume and a non-controlled atmosphere volume.

Embodiment 48

The robot of embodiment 47, wherein the cooling system further comprises a fan which is disposed within the controlled atmosphere volume and is configured to promote circulation of air over the cold plate.

Embodiment 49

The robot of embodiment 48, wherein the controlled atmosphere volume comprises an inlet and an outlet, and wherein the fan is configured to purge the controlled atmosphere volume via circulation of a gas from the inlet, through the controlled atmosphere volume, and to the outlet.

Embodiment 50

The robot of embodiment 45, wherein the cooling system further comprises a heat exchanger that is configured to remove at least a portion of the heat from the fluid circulation loop.

Embodiment 51

The robot of embodiment 45, wherein the cold plate is disposed in contact with the electrical component.

Embodiment 52

The robot of embodiment 41, wherein the cooling system is attached to a second robot and provides cooling to the robot, the second robot, or a combination thereof.

Embodiment 53

The robot of embodiment 52, wherein the robot comprises an iron roughneck and the second robot comprises a drill floor robot, or a pipe handler, or a combination thereof.

Embodiment 54

The robot of embodiment 41, wherein the electrical component comprises an electronic controller that controls a function of the robot.

Embodiment 55

The robot of embodiment 41, further comprising a motor disposed within the controlled atmosphere volume.

Embodiment 56

The robot of embodiment 41, wherein the robot comprises a 90% electro-mechanically controlled system, a 90% electro-mechanically powered system, or a combination thereof.

Embodiment 57

The robot of embodiment 41, wherein the robot comprises an iron roughneck, a drill floor robot, a multi-size elevator, a pipe handler, a tubular handler, a racking system, or a combination thereof.

Embodiment 58

A method for conducting a subterranean operation, the method comprising:
operating a robot on a rig;
controlling operation of the robot via at least one electrical component disposed within a controlled atmosphere volume of the robot; and
cooling the at least one electrical component via a cooling system that is disposed within a housing of the robot and is at least partially disposed within the controlled atmosphere volume.

Embodiment 59

The method of embodiment 58, further comprising:
coupling the cooling system to a second robot on the rig; and cooling at least a portion of the second robot via the cooling system.

Embodiment 60

The method of embodiment 59, wherein the robot is an iron roughneck and the second robot is a drill floor robot, a pipe handler, or a combination thereof.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Moreover, not all of the activities described above in the general description or the examples are required, that a portion of a specific activity cannot be required, and that one or more further activities can be performed in addition to those described. Still further, the order in which activities are listed is not necessarily the order in which they are performed.

The disclosure is submitted with the understanding that it will not be used to limit the scope or meaning of the claims. In addition, in the foregoing disclosure, certain features that are, for clarity, described herein in the context of separate embodiments, can also be provided in combination in a single embodiment. Conversely, various features that are, for brevity, described in the context of a single embodiment, can also be provided separately or in any subcombination. Still, inventive subject matter can be directed to less than all features of any of the disclosed embodiments.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A robot for conducting a subterranean operation comprising:
a main body comprising a housing;
a controlled atmosphere volume disposed within the housing;
an electrical component disposed within the controlled atmosphere volume; and
a cooling system disposed in the housing, wherein a first portion of the cooling system is disposed within the controlled atmosphere volume, and a second portion of the cooling system is disposed outside of the controlled atmosphere volume and spaced away from the controlled atmosphere volume, wherein the cooling system is attached to a second robot and provides cooling to the second robot.

2. The robot of claim 1, wherein the controlled atmosphere volume is configured to be Atmosphere Explosible (ATEX) certified or International Electrotechnical Commission for Explosive Atmospheres (IECEx) certified according to explosive (EX) Zone 1 requirements.

3. The robot of claim 1, wherein the cooling system traverses a boundary between the controlled atmosphere volume and a non-controlled atmosphere volume.

4. The robot of claim 3, wherein the cooling system comprises a cooling unit and a heat sink.

5. The robot of claim 4, wherein the heat sink comprises a cold plate and the cold plate transfers heat from the cold plate to a fluid circulation loop, and wherein the fluid circulation loop transfers the heat from the cold plate to the cooling unit.

6. The robot of claim 5, wherein at least a portion of the cold plate, at least a portion of the fluid circulation loop, at least a portion of the cooling unit, or a combination thereof are disposed within the controlled atmosphere volume.

7. The robot of claim 6, wherein the cooling unit traverses a boundary between the controlled atmosphere volume and a non-controlled atmosphere volume.

8. The robot of claim 7, wherein the cooling system further comprises a fan which is disposed within the controlled atmosphere volume and is configured to promote circulation of air over the cold plate.

9. The robot of claim 8, wherein the controlled atmosphere volume comprises an inlet and an outlet, and wherein the fan is configured to purge the controlled atmosphere volume via circulation of a gas from the inlet, through the controlled atmosphere volume, and to the outlet.

10. The robot of claim 5, wherein the cooling system further comprises a heat exchanger that is configured to remove at least a portion of the heat from the fluid circulation loop.

11. The robot of claim 5, wherein the cold plate is disposed in contact with the electrical component.

12. The robot of claim 1, wherein the cooling system provides cooling to the robot.

13. The robot of claim 12, wherein the robot comprises an iron roughneck and the second robot comprises a drill floor robot, or a pipe handler, or a combination thereof.

14. The robot of claim 1, wherein the electrical component comprises an electronic controller that controls a function of the robot.

15. The robot of claim 1, further comprising a motor disposed within the controlled atmosphere volume.

16. The robot of claim 1, wherein the robot comprises a 90% electro-mechanically controlled system, a 90% electro-mechanically powered system, or a combination thereof.

17. The robot of claim 1, wherein the robot comprises an iron roughneck, a drill floor robot, a multi-size elevator, a pipe handler, a tubular handler, a racking system, or a combination thereof.

18. A method for conducting a subterranean operation, the method comprising:
   operating a robot on a rig;
   controlling operation of the robot via at least one electrical component disposed within a controlled atmosphere volume of the robot; and
   cooling the at least one electrical component via a cooling system that is disposed within a housing of the robot, wherein a first portion of the cooling system is disposed within the controlled atmosphere volume, and a second portion of the cooling system is disposed outside of the controlled atmosphere volume and spaced away from the controlled atmosphere volume; and
coupling the cooling system to a second robot on the rig.

19. The method of claim 18, further comprising:
   cooling at least a portion of the second robot via the cooling system.

20. The method of claim 19, wherein the robot is an iron roughneck and the second robot is a drill floor robot, a pipe handler, or a combination thereof.

* * * * *